United States Patent
Singh

(10) Patent No.: US 6,237,579 B1
(45) Date of Patent: May 29, 2001

(54) DESIGN TO IMPROVE TURBULENCE IN COMBUSTION CHAMBERS

(76) Inventor: Somender Singh, 631/A, Hyder Ali Road, Nazarbad, Mysore - 570010, Karnataka (IN)

( * ) Notice: Subject to any disclaimer, the term of this patent is extended or adjusted under 35 U.S.C. 154(b) by 0 days.

(21) Appl. No.: 09/237,310

(22) Filed: Jan. 26, 1999

(51) Int. Cl.$^7$ .................................................. F02B 23/00
(52) U.S. Cl. ....................................... 123/661; 123/193.5
(58) Field of Search ............................ 123/193.5, 193.3, 123/661, 559.1

(56) References Cited

U.S. PATENT DOCUMENTS

| | | | |
|---|---|---|---|
| 4,280,459 | * 7/1981 | Nakanishi et al. | 123/661 |
| 5,065,715 | * 11/1991 | Evans | 123/661 |
| 5,103,784 | * 4/1992 | Evans | 123/661 |
| 6,047,592 | * 4/2000 | Wirth et al. | 123/661 |

FOREIGN PATENT DOCUMENTS

| | | | |
|---|---|---|---|
| 27410121 | * 3/1979 | (DE) | 123/193.5 |
| 2741121 | * 3/1979 | (DE) | 123/193.5 |
| 175225 | * 8/1986 | (JP) | 123/661 |

* cited by examiner

*Primary Examiner*—John Kwon
(74) *Attorney, Agent, or Firm*—Stephen G. Matzuk

(57) ABSTRACT

A combustion chamber design layout of grooves or channels or passages formed in the squish band to further enhance turbulence in the charge prior to ignition as compared to existing designs with squish bands or hemispherical layouts in I.C. Engines. These grooves or channels or passages after ignition direct the flame front to cause multipoint ignition during the combustion cycle resulting in the following distinct advantages over existing designs in practice. First, quicker and complete clean burn combustion; second, lower operating temperatures due to the higher flame velocities; third, enhanced torque and power through the entire range resulting in better fuel economy with lower Emissions; and fourth, smoother engine operation through the entire range enhancing engine life.

10 Claims, 2 Drawing Sheets

DESIGN TO IMPROVE TURBULENCE IN COMBUSTION CHAMBERS

FIELD OF THE INVENTION

The present invention relates to improvements in combustion by enhancing the turbulence and multipoint ignition in two- and four-cycle internal combustion (I.C.) engines.

BACKGROUND OF THE INVENTION

In normally aspirated two and four cycle I.C. engines the basic combustion process is as follows. The air-fuel mixture is drawn into the engine through the carburetor due to the low pressure created by the ascending or descending piston depending on two and four cycle. The controlled air-fuel mixture is then compressed by the rising piston in the cylinder to a desirable compression ratio determined by the fuel. The compressed gases are ignited through a spark plug located in the cylinder head before top dead center (TDC) resulting in a sharp increase in temperature and pressure inside the combustion chamber. The expanding gases push the piston down which in turn gets the crank rolling and storing the energy in a flywheel to do useful work.

Ultimately, the flame velocity and degree of combustion have a direct bearing on the a) power output, b) efficiency of engine, c) fuel consumption, d) emission, e) operating temperature, f) sound and vibration levels and g) reliability. The flame velocity and degree of combustion are directly related to the state of turbulence in the charge prior to ignition.

In existing combustion chambers designs in I.C. engines, the combustion chamber is the enclosed space within the cylinder, the cylinder-head and above the piston where burning of charge occurs. The combustion chambers play a vital role in engine characteristics. Since the inception of the I.C. engine, a lot of research and development has been carried out to perfect the combustion chamber to achieve maximum engine efficiency and reliability. The trend in combustion chamber design has been to direct the expanding forces caused due to combustion towards the piston crown and to avoid the dissipation of these forces in the direction that do not produce power.

Two stroke combustion chambers, due to their relatively simple layouts, have evolved and revolved around hemispherical layouts with a center or offset spark plug location since their inception. Four stroke combustion chambers of the early types featured side valves layouts with their large volume low compression cylinder heads prone to detonation and low power outputs.

The most notable research on combustion chambers in the early days was done by Sir Harry Recardo, who enlightened the world about the causes of Detonation and Pinging. Recardo discovered Pinging and Detonation arose through uncontrolled instantaneous combustion occurring in pockets of fuel in the extreme ends of the combustion chamber due to the extreme heat and pressure build up. Ricardo's solution was to concentrate the greater part of the clearance volume over the side valves layout and reducing greatly the clearance between the larger part of the combustion chamber which extended over the piston crown. In the Ricardo layout, the space between the piston and the cylinder head was so small and the surface so cool in relation to the combustion temperatures that the gases trapped in this "Quenched" area did not detonate in the combustion cycle under load. This was an improvement over other combustion chambers. Later over-head valve (O.H.V) layouts gained popularity due to several advantages and attained higher power outputs and sustained reliability. The shape and sizes of four stroke combustion chambers with their overhead valves layouts went through many design changes over the years.

The four stroke combustion chamber layouts evolved through the plain cylindrical form with the required clearance volume, the bath tub type, the wedged shape type, and the hemispherical cross flow type. The hemispherical combustion chamber or hemi-head provides room to accommodate larger valves increasing volumetric efficiency and permits centrally located spark plug which contribute to more efficient combustion, better heat dissipation and higher thermal efficiency.

The concept of a portion of the combustion chamber at close proximities to the piston crown at TDC came to be known as "squish" area or "squish" band earlier referred to as quenched area. In principle, the trapped charge between the piston crown and the squish area nearing TDC starts to be injected towards the main scoop of the combustion chamber causing turbulence prior to ignition greatly reducing detonation and pinging. Higher compression ratios are possible with squish bands resulting in improved engine efficiencies. Turbulence in the charge is also caused by inlet ports, their shapes, angles and surface finish. They greatly help to keep the air-fuel mixture bonded and in a homogeneous state at the point of entry only. Multipoint fuel injection basically achieves very fine break ups of fuel particles prior to entry on the intake stroke and achieves better combustion due to the ideal state of the charge.

Two stroke engines have lesser volumetric efficiency due to the obstruction in the ports and short time/area available in the intake and transfer phase. Due to the size, shape and angles of the ports the charge is in a higher state of turbulence entering the cylinder than four strokes and requires far lesser ignition advance to operate efficiency irrespective to combustion chamber design. Four strokes require higher degree of ignition advance and assisted by vacuum advance to operate efficiently due to the lower state of turbulence and a denser charge before combustion. The turbulence inside the cylinder and head mainly helps to maintain the air-fuel mixture in a gaseous state and prevent condensation of fuel droplets preventing erratic and incomplete combustion. In recent times the most accepted practice to create turbulence is to provide squish bands in the combustion chamber.

The squish area are normally placed in the outer circumference of the combustion chamber and are machined smooth. The squish area could be a band or a tapered area or two bands on opposite sides. The squish area are either flat or angled depending on the profile of the piston crown. They are machined smooth to a high degree of finish and set up in design with a close tolerance between combustion chamber and piston at TDC preventing contact.

In principle, the piston on the upward stroke causes the compression to progressively increase. Nearing TDC, the gases around the squish band and the piston crown are pushed towards the center scoop causing Turbulence which in turn improve flame propagation as ignition has occurred before TDC and greatly reduces Pinging and Detonation. Thus, present day two stroke combustion chambers are hemispherical or the "top hat" type with a circular or partial squish band and are machined smooth with no sharp edges. The spark plugs are located centrally or offset depending on the requirement. They are made of alloys of aluminum of high conductivity and, in certain cases, are water cooled.

Present day four stroke combustion chambers house the inlet and exhaust valves. Multiple valve layouts are standard feature in high performance design. Partial or circular squish bands are provided and are finished smooth to a high degree with no sharp edges. The spark plug is location depends on design and availability of space. In the case of aircraft engines, twin plugs are mandatory. Cylinder heads are largely made of alloys of aluminum having steel inserts for valve seats and water cooled in most cases. Basic designs typically are bath tub, wedged or double wedged with a flat roof or hemispherical cross flow type with inclined valve layouts.

Over the last 60 years standard practice is to have a squish area of 20% to 40% or more of the combustion chamber area either concentric or offset to the cylinder axis at close proximities of the piston crown, causing turbulence in two stroke engines. Depending on the number of valves and layouts, four stroke combustion chambers are machined to provide the squish area resulting in a puff of mixture pushed towards the spark plug causing turbulence resulting in better combustion.

In either case the surface of the combustion chamber, squish bands and the piston crown are normally machined smooth with a high degree of finish with the right tolerance to prevent contact at TDC on existing two and four cycle engines in production.

Compared to diesel engines (with their higher efficiencies), the present day combustion chamber layouts in two and four cycle petrol (gasoline) engines include the following design defects and limitations. First, diesel engines operate at higher efficiencies due to the turbulence caused by direct diesel injection into the combustion chamber before TDC. Second, the diesel also burns more completely due to the turbulence created by the high pressure spray resulting in lesser emissions and unburnt fuel. Third, the diesel has higher resistance to flash point due to its composition and hence can withstand much higher compression ratios than petrol or kerosene. Fourth, the petrol and kerosene engines have a threshold on compression ratios due to its properties and lower flash points compared to diesel. Fifth, the petrol and kerosene need to be atomized with air to form a homogenous mixture before it is drawn into the cylinder, as compared to the diesel which is injected prior to ignition directly into the combustion chambers. Sixth, as compression is applied the air-fuel mixture tends to get unstable and starts to separate and condense causing erratic and incomplete combustion. Seventh, the only possible method to keep the mixture in a homogeneous state is to induce turbulence prior to ignition. Eighth, the only method known to cause turbulence are squish bands or squish areas located in the combustion chambers which help retain the air-fuel mixture. Ninth, squish bands have their disadvantages too. They prevent total combustion as fuel trapped between the squish band are less volatile due to the lower temperatures caused by masking. Tenth, squish bands and compression ratios have their limitations on creating turbulence, often resulting in heat build up due to uneven thickness of metal in the squish band resulting in detonation and pinging under load. Eleventh, very often at lower operating speeds incomplete combustion occurs causing excessive emissions and poorer torque compared to diesel engines. Twelfth, leaner air-fuel mixture result in slower flame velocities resulting in excessive heat build up causing emissions of oxides of nitrogen. Thirteenth, in two cycle engines the combustion temperature builds up very rapidly due to the short intervals of combustion occurring each revolution. Hence compression ratios are critical and cannot be increased to four stroke parameters. Fourteenth, the charge comprising of petrol/air drawn in the induction stroke is invariably preheated due to engine temperatures and further heated by compression bringing it to a critical state before ignition. Fifteenth, carbon deposits in the combustion chamber absorb heat and cannot dissipate the heat into the combustion chamber and eventually contribute to preignition and detonation and auto ignition once the engine is switched off. Sixteenth, under load, lean burn, high compression engines require very careful monitoring of air-fuel ratios and ignition timing to avoid pinging and detonation resulting in excessive emissions. Seventeenth, there are limits to which a petrol I.C. engine could stand up to. Exceeding these limits the existing combustion chamber design cannot cope with the following parameters: a) temperature build up during combustion cycle resulting in detonation and pinging under load; b) squish bands greatly reduce detonation and pinging, but cause unburnt fuel and excessive emissions; c) carbon build up in combustion chambers and piston crown build up compression ratios and largely contribute to auto ignition and erratic and noisy running resulting in excessive emissions; d) richer mixture bring down combustion chamber temperature but result in excessive carbon monoxide and Carbon emissions; e) leaner settings result in low flame velocities and higher combustion temperatures due to time lag, causing emissions of oxides of nitrogen.

SUMMARY OF THE INVENTION

The present invention provides a fuel-air turbulence prior and during combustion, which causes a multipoint ignition in the combustion chamber of I.C. engines, with the following distinct advantages. First, more power output is derived from the same given charge operating on the same compression ratio. Secondly, lesser emission due to far more complete combustion is provided. Third, far lesser carbon deposits in the combustion chamber, piston crown and exhaust system occur due to controlled complete combustion. Fourth, exhaust gas temperatures and combustion chamber temperatures are lower due to quicker and even multipoint flame propagation. Fifth, there is no pinging or detonation or auto ignition due to reduced temperature in the combustion chamber and no residue of unburnt fuel. Sixth, there is better fuel economy due to improved and complete combustion. Seventh, the use of higher compression ratios for the same fuel without adverse effects is allowed. Eighth, lower octane fuel may be used without any adverse effect on performance loss on existing compression ratios. Ninth, noise levels and combustion vibrations are reduced due to even and complete combustion. Tenth, the reduced operating temperatures due to the short flame travel and complete combustion greatly reduce oxides of nitrogen and carbon and extend engine oil life and prevent contamination. Eleventh, lesser ignition advance is required due to the high degree of turbulence resulting in quick and efficient combustion delivering a) improved torque and power outputs, b) lesser emissions and carbon deposits, c) improved specific fuel consumption, and d) lower operating temperatures and noise levels enhancing engine life. Thus, according to the present invention, the above advantages are achieved without side effects.

This particular invention includes a specific design change to the "squish" band or "squish" area located in the combustion chamber or piston crown of I.C. engines. This specific design change further enhances turbulence in the charge prior and during the combustion cycle by varied flame velocities in the form of multipoint ignition. The rapid multipoint flame front engulfs the air-fuel charge resulting in controlled complete burning of the charge in the shortest possible time with no residue of unburned fuel. This unique form of controlled complete quick combustion greatly enhances power characteristics and greatly reduces emissions of nitrous oxides and carbon monoxide.

BRIEF DESCRIPTION OF THE DRAWING

These and further features of the present invention will be better understood by reading the following Detailed Description together with the Drawing, wherein.

DETAILED DESCRIPTION OF THE INVENTION

The elements of the Figures comprise: 1—grooves; 2—channels; 3—passages; 4—squish band; 5—combustion chamber; 6—piston crown; 7—spark plug; 8—cylinder head; and 9—valves.

Figure 1:
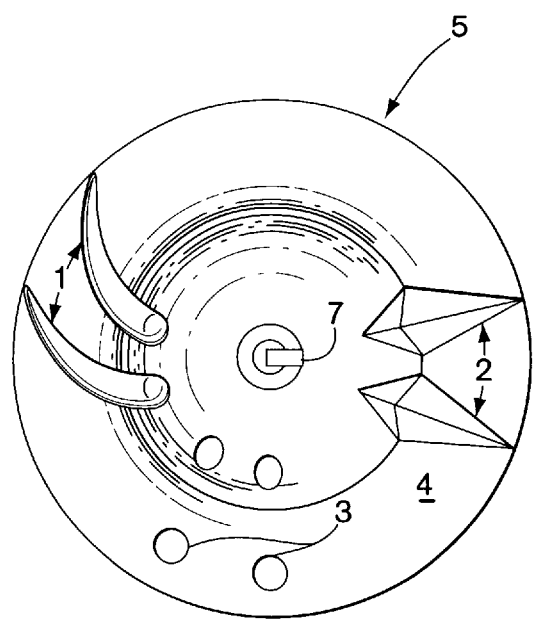
FIG. 1 is a plan view of a two stroke combustion chamber layouts with grooves 1, channels 2 and passages 3.
Figure 2:
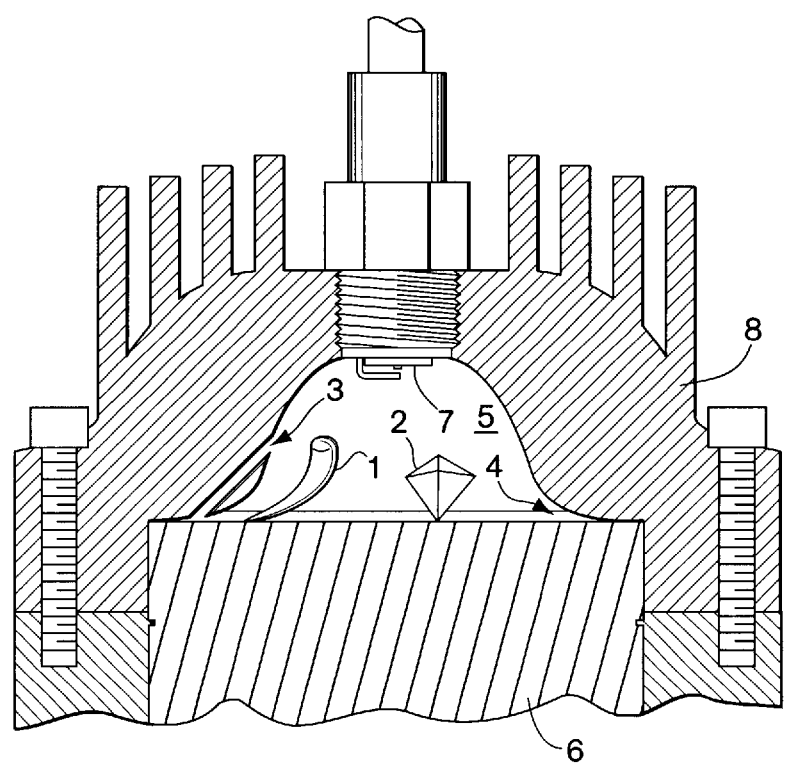
FIG. 2 is an elevational cross section layout of two stroke combustion chamber with grooves, channels, passages and piston.
Figure 3:
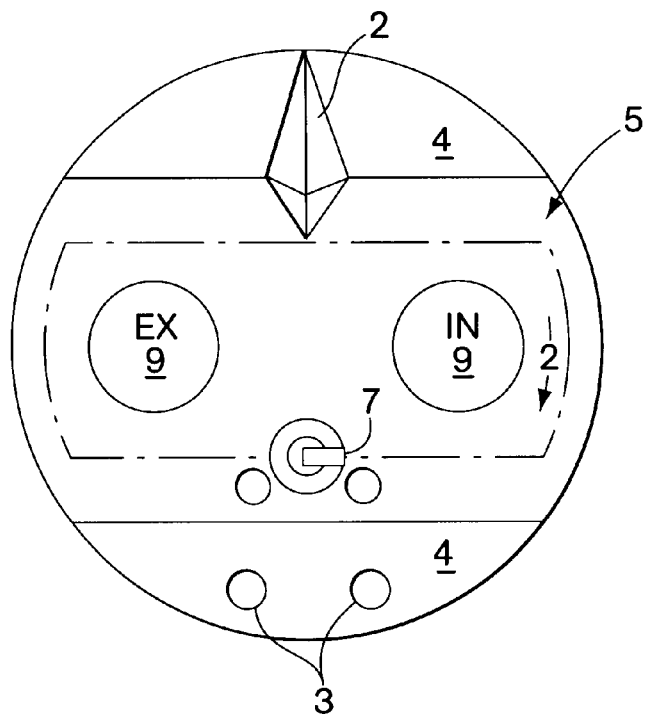
FIG. 3 is a plan view of a four stroke combustion chamber layout with channels 2 and passages 3.

This particular invention works on the following principles Ref FIG. 1 & FIG. 2 into or onto the squish band 4 or squish area or flat surfaces of the combustion chamber 5, series of grooves 1 or channels 2 or passages 3 are formed either in the initial casting process or machined to specifications later. These grooves or channels or passages form the shortest path or passage from the spark plug 7 location to the ends of the combustion chamber through the squish band 4 or squish area or flat surfaces of the combustion chambers of I.C. Engines. These grooves or channels or passages squirt the air-fuel charge trapped between the piston crown and the squish band towards the center scoop of the combustion chamber on the upward stroke.

The effects of the grooves, channels and passages cause the air-fuel charge to be in a greater state of turbulence prior to ignition in the combustion chamber. When the spark plug 7 located normally in the center of the combustion chamber ignites the air-fuel charge, which presently is in a high state of turbulence the flame front engulfs the dense volatile charge present in the combustion chamber through these grooves or channels or passages and causes flame turbulence in the ends of the combustion chamber by the time the main flame front has reached the piston crown. This form of multipoint combustion causes total quick controlled combustion leaving no room for unburnt fuel or temperature increase to cause pinging or Detonation in the extreme ends of the combustion chamber. This unique form of multipoint flame front combustion exerts the maximum force of the expanding gases towards the piston crown delivering optimum torque through the entire range.

Figure 4:
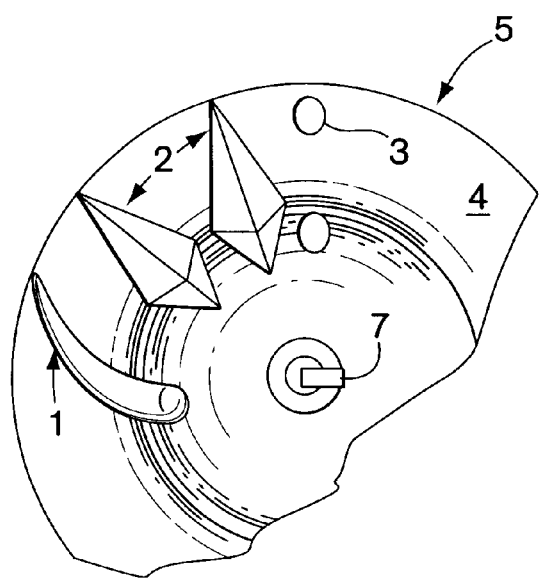
FIG. 4 is a plan view of a close up layout of grooves 1, channels 2 and passages 3 in the squish band.

Referring to FIG. 4, the grooves 1 or channels 2 or passages 3 act two ways. They induce turbulence in the air-fuel charge by forcing the charge through these grooves or channels or passages towards the spark plug 7 preventing fuel separation and condensation taking place due to the compression applied and prevent stagnation of the charge prior to combustion as the reciprocating piston 6 comes to a momentary halt at TDC as shown in FIG. 2. When the turbulent dense volatile charge is ignited before TDC the flame front travels through these grooves 1 or channels 2 or passages 3 to the extreme corners of the combustion chamber causing a high degree of flame turbulence while the main flame front engulfs the main change leaving no form of unburnt fuel residue resulting in total controlled quick efficient clean burn combustion in two and four cycle engines. This unique design concept is applicable to all forms of two and four cycle combustion chamber designs in I.C. engines irrespective to the fuel in use. On diesel engines, the same principles are applicable on the piston crown which performs like a combustion chamber due to the small clearance volumes required to attain the ultra high compression ratios and diesel fuel being sprayed by the injectors located in the cylinder head. In principle, the design functions on varied flame velocities which actually cause the turbulence in the air-fuel mixture during combustion resulting in a quick and efficient combustion cycle compared to existing designs.

Thus, according to the method of according to the present invention, improved turbulence is provided in the air-fuel charge before ignition and greatly improving flame propagation after ignition in the combustion chambers of two and four cycle I.C. engines during the combustion cycle resulting in improved engine efficiency over existing designs. Moreover, no previous or existing combustion chamber has any resemblance or design incorporating grooves or channels or passages either formed or machined or drilled into the combustion chamber or squish band or squish area or wedged area or flat surfaces to induce turbulence in the air fuel charge prior to combustion on the upward stroke of the piston. No previous or existing combustion chamber has any design to induce turbulence other than squish bands. Furthermore, after ignition occurs the flame front engulfs the charge by simultaneously burning through the grooves or channels or passages reaching the far ends of the combustion chamber in the shortest possible time causing flame and gas turbulence while the main flame front burns through the bulk of the charge in the center scoop of the combustion chamber. No present day combustion chamber operates on these principles of multipoint combustion.

The multipoint ignition according to the present invention brings about flame turbulence which in turn intermingles and result in a combined total complete efficient combustion with no residue of unburnt fuel. Such turbulence and other advantages are provided by the unique physical layouts of the grooves or passages in combustion chamber according to the present invention, especially drawings FIG. 1, FIG. 2, FIG. 3 and FIG. 4.

The grooves 1, or channels 2, or passages 3 are either arranged in a pattern that radiate out of the cylinder axis like spokes in a hub of a wheel or in a pattern that radiate out of an offset angle to the center or straight from the nearest point to the spark plug extending to the ends of the combustion chamber through the squish band or squish area or flat areas 4. These grooves or channels or passages are either straight or angled or curved and have a depth or diameter proportional to the circumference of the combustion chamber in relation to the cylinder bore diameter and squish band or squish area. These grooves or channels or passages start from the extreme ends of the combustion chamber and taper out to a point closest to the plug. No past or present design of combustion chambers wither two stroke or four stroke have any features or resemblance or concept to inducing turbulence before and after ignition cause multipoint combustion. According to the present invention, these grooves or channels or passages impart a squirting and swirling motion in the air fuel charge to create vortices that induce a higher degree of turbulence in the charge prior to ignition than any previous or existing combustion chambers in practice. Moreover, these grooves or channels or passages, due to their location, cause multipoint ignition once ignited partly due to the shorter distances the flame front needs to travel and reach the extreme ends of the combustion chamber while the main bulk of the ignited charge located in the center scoop is thrusting forward towards the piston crown. In these critical milliseconds of the combustion cycle in existing engines the piston is progressively loosing speed to come to a momentary dead halt at TDC causing stagnation of charge before it starts to speed up in the downward stroke. No previous or present day combustion chambers have any method to induce multiple combustion and inter mingling of charge occurring at this critical location of the piston at TDC, resulting in controlled efficient combustion utilizing the entire air fuel charge to its maximum efficiency in the shortest possible time. Thus, according to the present invention, these grooves or channels or passages cause rapid progressive complete combustion in the shortest possible time resulting in lower build up of temperatures in the combustion chamber, piston crown, cylinder walls and spark plug. Lower temperatures cause lesser distortion of metal parts resulting in lesser "blowby" of burned gases past piston rings and valve seats and better retention of compression ratios through the entire range.

The lower combustion chambers temperature greatly reduce emissions of nitrous oxide, oil contamination and oil discoloring. Existing combustion chamber greatly fall short in controlling excessive temperature build ups resulting in pinging, detonation and auto-ignition.

Also, the varied flame velocities occurring after ignition due to the formation of grooves, channels or passages result in shorter flame front travel through the walls of the combustion chamber to the extreme ends in comparison to the main bulk of ignited flame front which needs to follow the profile or contours of the combustion chamber to reach the extreme ends. This form of multipoint combustion results in clean burn efficient combustion with maximum utilization of the trapped air fuel charge delivering improved economy, enhanced torque and far lower emissions of carbon monoxides and carbon through the entire range as compared to previous or existing combustion chamber design. This form of induced turbulence in combustion chambers greatly helps to retain air fuel mixture in an optimum state for combustion. Once ignited the varied flame velocities cause multipoint controlled clean burn combustion greatly reducing combustion vibrations resulting in super smooth engine operation through the entire range. No previous or existing combustion-chamber design is capable of achieving total controlled combustion with a single source of ignition achieving all the above listed inventive features.

Therefore, this unique concept of forming grooves or channels or passages in the squish area or flat areas of the combustion chamber induces turbulence and optimum multipoint flame propagation after ignition is applicable to all two and four cycle petrol or kerosene or liquid petroleum gas engines of any cylinder capacity achieving all the claims listed above with no adverse effects.

Furthermore, the same principles apply to piston crowns of Diesel engines resulting in lower emissions, smooth engine operation and improved engine efficiency through the entire operating range. Thus, this unique functions on varied flame velocities which actually cause the turbulence in the air-fuel mixture during combustion results in a quick and efficient combustion cycle compared to existing designs.

What is claimed is:

1. An increased efficiency internal combustion engine, comprising:
    a tubular combustion chamber having a volume including a squish area and a main scoop area;
    means for introducing a fuel/air mixture from an external source into said main scoop area volume; and
    a means for igniting said fuel/air mixture introduced into said combustion chamber main scoop area, wherein
        said combustion chamber includes a surface therein having at least one of a channel through, and a plurality of grooves thereon extending from said main scoop area and diminishing in cross-section to radially distal portions of said combustion chamber providing passage of ignited fuel/air flame fronts therethrough to the radial extremes of said combustion chamber.

2. The increased efficiency internal combustion engine of claim 1, further including a spark plug, wherein said grooves are arranged to radiate outward therefrom.

3. The increased efficiency internal combustion engine of claim 1, wherein said grooves are disposed to impart a squirting and swirling motion in said fuel/air mixture prior to ignition.

4. The increased efficiency internal combustion engine of claim 1, adapted to burn fuel comprising at least one of gasoline, kerosene, liquid petroleum gas and diesel fuel.

5. A method of improved combustion in an internal combustion engine, comprising the steps of:
    introducing a fuel/air mixture into a combustion chamber main scoop area;
    igniting said fuel/air mixture into a flame having an expanding flame front; and
    conveying said flame front to radially distal portions of said combustion chamber via a plurality of combustion chamber channels extending outwardly to corners of said combustion chamber.

6. The method of claim 5, further including the step of urging said fuel air mixture towards a fuel/air ignitor prior to ignition.

7. The method of claim 6, further including the step of inducing turbulence in said fuel/air mixture prior to combustion on the compressing stroke of a piston forming part of said combustion chamber.

8. The method of claim 5, further including the step of simultaneously burning through said fuel/air mixture along said channels to the distal ends thereof to cause gas turbulence while a main flame front burns through the bulk of the fuel/air mixture charge in the center scoop of said combustion chamber.

9. The method of claim 5, wherein the steps of igniting and urging further result in multipoint ignition of said fuel/air mixture.

10. The method of claim 5 wherein the step of introducing a fuel/air mixture comprises the step of introducing at least one of gasoline, kerosene, liquified natural gas and diesel fuel.

* * * * *